United States Patent
Tamura

[11] 3,797,201
[45] Mar. 19, 1974

[54] ABSORPTION PROCESS FOR GAS SEPARATION

[76] Inventor: Takaai Tamura, No. 5-7, 2-chome Kitano, Mitaka-shi, Tokyo, Japan

[22] Filed: Mar. 17, 1972

[21] Appl. No.: 235,487

[30] Foreign Application Priority Data
Mar. 27, 1971  Japan.............................. 46-17619

[52] U.S. Cl. ........................................ 55/62, 55/75
[51] Int. Cl. ............................................ B01d 53/04
[58] Field of Search ...................... 55/25, 58, 62, 75

[56] References Cited
UNITED STATES PATENTS

| | | | |
|---|---|---|---|
| 3,279,153 | 10/1966 | Basmadjiah et al.................... | 55/58 |
| 3,085,379 | 4/1963 | Kiyonaga et al....................... | 55/58 |
| 3,338,030 | 8/1967 | Feldbayer............................... | 55/58 |

*Primary Examiner*—Charles N. Hart
*Attorney, Agent, or Firm*—Wenderoth, Lind & Ponack

[57] ABSTRACT

In a process of separating a readily adsorbable gas and a less readily adsorbable gas separately from a mixture of these gases by introducing the gas mixture into an adsorption column containing an adsorbent to adsorb thereon the readily adsorbable gas and then recovering the adsorbed gas by desorbing it under a reduced pressure, the purity of the readily adsorbable gas thus recovered is greatly increased by purging the adsorption column prior to the desorption step with a pure gas having almost the same composition as the adsorbed gas at an almost same pressure as that in the adsorption step. Also, by introducing into the column a pure gas having the same composition as the less readily adsorbable gas prior to the introduction of the gas mixture, the less readily absorable gas is recovered in a high pure state in the above gas recovery process.

6 Claims, 3 Drawing Figures

ABSORPTION PROCESS FOR GAS SEPARATION

DISCLOSURE OF THE INVENTION

The present invention relates to separating gases from a gas mixture by an adsorbent and more particularly, the invention relates to a process for separating in an industrial scale from a gas mixture the gas component which is most readily absorbed on an adsorbent (hereinafter, such a gas component is called "readily adsorbable gas or gas component") in a high pure state. Still further, the invention relates to a process for recovering in an industrial scale from a gas mixture the readily adsorbable gas component and the component which is most weakly adsorbed on the adsorbent (hereinafter, such a gas component is called "less readily adsorbable gas component") each in a high pure state.

Various attempts have been made for separating a specific gas component or specific gas components by utilizing the selective adsorptive property of each gas component in the gas mixture. In such conventional gas separation processes, a gas mixture is introduced into an adsorption column packed with an adsorbent from one end thereof to adsorb the readily adsorbable component, while recovering the less readily adsorbable component as an enriched component from the opposite end of the column, and if necessary, the adsorbed component is also recovered by heating or suction. Such a gas separation process by using adsorbent has now been utilized in various fields and furthermore it has recently been attempted to separate oxygen or nitrogen from air by using a kind of adsorbent called molecular sieve.

However, such known separation means are based on a simple combination of an adsorption step and a desorption step and thus any of these known processes have not yet been developed for obtaining high pure gases in an industrial or economical scale. In particular, it is accompanied with many difficulties to recover high pure oxygen or nitrogen from air in an industrial scale.

The inventor of the present invention has previously discovered an improved adsorption process for gas separation and has succeeded in recovering a less readily adsorbable gas component from a gas mixture thereof in a high pure state and with a high efficiency (Japanese Patent Application No. 73,151/1965). In particular, by practicing the improved adsorption process using the specific adsorbent prepared by treating a naturally occurring tuff as will be described below in detail, it has been possible to separate high pure oxygen from air.

According to my improved process, in the case of conducting the adsorption process by subjecting first the adsorption column to a desorption procedure under a reduced pressure (desorption step) and then introducing a gas mixture into the adsorption column from an end thereof and while maintaining the pressure in the column at normal pressure or a definite pressure higher than the normal pressure, continuing the introduction of the gas mixture, whereby the readily adsorbable gas composition is adsorbed on the adsorbent and at the same time the less readily adsorbable component is recovered from the opposite side of the column in a pure state (adsorption step), by applying a feedback step between the desorption step and the adsorption step, that is, by introducing a high pure gas having the same composition as the less readily adsorbable gas into the column immediately after the completion of the desorption procedure until the pressure in the column reaches a definite pressure, the break through curve can be sharpened and hence the less readily adsorbable gas composition can be separated from the gas mixture in a high-pure state and with a high yield.

Moreover, when the improved adsorption process is conducted by employing the specific adsorbent as will be explained below, high pure oxygen containing less than 0.1 percent nitrogen can be separated from air.

However, the above process aims at the recovery of the less readily adsorbable gas component and thus when the above process is applied for recovering the readily adsorbable gas component, that is, recovering the gas component adsorbed on the adsorbent in a desorption step under a reduced pressure, it is difficult to obtain the satisfactorily high pure product.

An object of the present invention is, accordingly, to provide a process of obtained in an industrial scale the readily adsorbable gas component in a high pure state from a gas mixture by using an adsorbent.

Other object of this invention is to provide a process of separating nitrogen in a high pure state from air in an industrial scale by using the specific adsorbent.

Further object of this invention is to provide a process of separating both of the readily adsorbable gas component and the less readily adsorbable gas component separately from the gas mixture thereof each in a high pure state by using an adsorbent.

Still other object of the present invention is to provide a process of recovering in an industrial scale high pure oxygen and high pure nitrogen separately from air by using the specific adsorbent.

As the results of various investigations, the inventor has discovered that by purging the adsorption column with a substantially pure gas having the same composition as the readily adsorbable gas under the same pressure as that in the adsorption step after conducting the adsorption step and, if necessary, recovering the less readily adsorbable gas, and prior to recovering the readily adsorbable gas component adsorbed on the adsorbent by subjecting it to a desorption procedure at a reduced pressure, the readily adsorbable gas component can be recovered in an extremely high pure state in the subsequent desorption step.

In this case, the high pure purging gas is supplied from an outer source or tank in the first step, but the gas recovered in the desorption step may of course be used. Moreover, by combining the process of the present invention and the feedback step discovered previously by the same inventor, the less readily absorbable gas component can be recovered in a high pure state together with the readily adsorbable gas component. Moreover, by using the specific adsorbent as mentioned below in the process of this invention, high pure nitrogen and high pure oxygen can be separated from air.

Now, the invention will be explained by referring to the FIGURE in the accompanying drawing, in which an embodiment of an adsorption column for conducting the process of this invention is illustrated.

Figure 1:
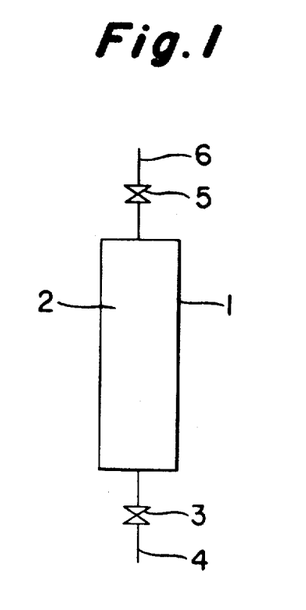

In FIG. 1, an adsorption column 1 is packed with an adsorbent 2 such as silica gel, activated carbon, zeolite, etc., to provide an adsorption unit. The adsorption column 1 is equipped with an inlet pipe 4 having a valve 3 and an outlet pipe 6 having a valve 6.

For the sake of simplicity, the example of this invention will be explained about the case of separating nitrogen or nitrogen and oxygen from air by using the adsorbent, although the invention is not limited to the case only. That is, as will be described in the examples of this invention, the process of this invention may be applied to the case of a carbon dioxide gas and oxygen each in a high pure state from a mixture of these gases, the case of separating $H_2$ and $N_2$ each in a high pure state from an ammonia decomposition gas, the case of separating valuable components from various petroleum cracking gases, etc.

Now, in an embodiment of the present invention, the inlet 4 of the adsorption column 1 containing an adsorbent having a higher adsorption power to nitrogen than to oxygen is connected to a suction pump (not shown) and the valve 3 is opened, while the valve 5 is closed. Thus, the column is evacuated by means of the suction pump to remove the components adsorbed on the adsorbent. Thereafter, air from which moisture and carbon dioxide have been previously removed (hereinafter such pre-treated air is called simply air in this specification) is introduced into the adsorbent column through the inlet 4. When the inner pressure of the adsorption colum reaches normal pressure, the valve 5 is opened and the intrduction of air is further continued. Thus, nitrogen in the air is adsorbed on the adsorbent and a gas enriched with oxygen is withdrawn from the outlet 6 of the column. In this case, although the gas thus withdrawn is not so pure as being used for industrial purposes, the gas may be recovered if necessary. When the component of the gas at the inlet 4 becomes almost the same as that of the gas at the outlet 6, the introduction of air is stopped. Thereafter, a pure nitrogen gas begins to introduce from an outer nitrogen source into the column 1 through the inlet 4. In this case, the pressure in the column is maintained at the pressure almost same as that in the introduction of air. Also, because, the valve 5 at the outlet 6 of the column is in an open state, when the introduction of air is continued, the excess gas is discharged through the valve 5 from the outlet 6 of the adsorption column 1. By the operation, the oxygen remaining in the air in the column and in the adsorbent is purged by the nitrogen gas. In this case, the purging gas may be introduced into the adsorption column from any side of the column. For example, same results are obtained when the pure nitrogen gas is introduced into the column from the conduit 6 and discharged from the conduit 4.

When almost no oxygen is present in the gas at the outlet 6 in the case of introducing the nitrogen gas from the inlet 4, the introduction of the nitrogen gas is stopped, the valve 5 is closed, and then the column 1 is evacuated through the outlet 4, whereby the nitrogen in the column and adsorbed in the adsorbent is recovered. This operation may be conducted by closing the valve 3 and evacuating from the pipe 6.

By the above-mentioned operation, high-pure nitrogen can be recovered and also a desired amount of such high pure nitrogen can be obtained by conducting the procedure repeatedly.

In other embodiment of the present invention, both of high-pure nitrogen and high-pure oxygen can be recovered from air. That is, after conducting the desorption step of the adsorption column 1, pure oxygen is introduced in the column from an outer oxygen source and when the oxygen pressure introduced in the column reaches normal pressure, air is introduced from the inlet 4 and at the same time high pure oxygen is recovered from the outlet 6. In the step, nitrogen is adsorbed on the adsorbent. Just before nitrogen begins to be present at the gas composition at the outlet end of the column, the introduction of air is stopped and then pure nitrogen is introduced into the column from the inlet 4 as mentioned above. Then, by conducting the same procedure as above, pure nitrogen can be recovered. Thus, desired amounts of pure oxygen and pure nitrogen can be recovered from air by repeating the above-mentioned process.

Furthermore, by employing the specific adsorbent as will be mentioned below as the third embodiment of this invention, very high-pure nitrogen or very high-pure nitrogen and very high-pure oxygen can be recovered from air.

That is, in the third embodiment of this invention, the adsorbent prepared by pulverizing into proper grain sizes a naturally occuring tuff consisting mainly of $SiO_2$, $Al_2O_3$, and $H_2O$, containing 1–10 weight percent of alkali and alkaline earth metal oxides, and having the X-ray diffraction pattern shown in Table 1 or Table 2 and then subjecting it to a dehydration treatment by heating to about 350°–700°C.

TABLE 1

| latice distance A | intensity 10 $I/I_o$ | latir distance A | intensity 10 $I/I_o$ |
|---|---|---|---|
| 13.9 ± 0.1 | 2 | 3.23 ± 0.03 | 6 |
| 9.1 ± 0.1 | 4 | 3.10 ± 0.03 | 0–1 |
| 6.6 ± 0.1 | 4 | 2.90 ± 0.03 | 3 |
| 6.5 ± 0.1 | 2 | 2.85 ± 0.03 | 0–2 |
| 6.1 ± 0.1 | 2 | 2.71 ± 0.03 | 1 |
| 5.83 ± 0.05 | 2 | 2.58 ± 0.03 | 1 |
| 4.55 ± 0.05 | 2 | 2.53 ± 0.03 | 2 |
| 4.30 ± 0.10 | 0–5 | 2.49 ± 0.03 | 0–4 |
| 4.26 ± 0.10 | 0–2 | 2.47 ± 0.03 | 0–3 |
| 4.08 ± 0.10 | 0–4 | 2.45 ± 0.03 | 0–2 |
| 4.05 ± 0.10 | 0–6 | 2.04 ± 0.03 | 2 |
| 4.01 ± 0.05 | 7 | 1.96 ± 0.03 | 1 |
| 3.85 ± 0.03 | 2 | 1.88 ± 0.02 | 1 |
| 3.81 ± 0.10 | 0–4 | 1.82 ± 0.02 | 1 |
| 3.77 ± 0.05 | 1 | 1.82 ± 0.02 | 0–2 |
| 3.48 ± 0.03 | 10 | 1.79 ± 0.02 | 1 |
| 3.40 ± 0.03 | 5 | 1.53 ± 0.02 | 1 |
| 3.35 ± 0.10 | 0–8 | | |

TABLE 2

| latice distance A | intensity 10 $I/I_o$ | latir distance A | intensity 10 $I/I_o$ |
|---|---|---|---|
| 9.10 ± 0.1 | 7 | 3.18 ± 0.03 | 4 |
| 7.99 ± 0.1 | 4 | 3.15 ± 0.03 | 4 |
| 6.82 ± 0.1 | 2 | 2.99 ± 0.03 | 0–1 |
| 5.85 ± 0.08 | 5 | 2.98 ± 0.03 | 4 |
| 5.29 ± 0.08 | 2 | 2.89 ± 0.03 | 4 |
| 5.12 ± 0.05 | 3 | 2.85 ± 0.03 | 0–2 |
| 4.67 ± 0.05 | 2 | 2.81 ± 0.03 | 3 |
| 4.30 ± 0.10 | 0–5 | 2.74 ± 0.03 | 1 |
| 4.26 ± 0.10 | 0–2 | 2.53 ± 0.02 | 2 |
| 4.08 ± 0.10 | 0–4 | 2.49 ± 0.03 | 0–4 |
| 4.05 ± 0.10 | 0–6 | 2.47 ± 0.03 | 0–3 |
| 3.98 ± 0.05 | 10 | 2.46 ± 0.02 | 2 |
| 3.85 ± 0.05 | 2 | 2.45 ± 0.03 | 0–2 |
| 3.81 ± 0.10 | 0–4 | 2.02 ± 0.02 | 0.5 |
| 3.77 ± 0.05 | 2 | 1.95 ± 0.02 | 0.05 |
| 3.47 ± 0.03 | 7 | 1.87 ± 0.02 | 0.5 |
| 3.34 ± 0.10 | 0–8 | 1.81 ± 0.02 | 0–2 |
| 3.35 ± 0.03 | 5 | 1.72 ± 0.02 | 0.5 |
| 3.22 ± 0.03 | 4 | | |

The material defined in Table I occurs mainly in the Tohoku and Chungoku districts in Japan and the material defined in Table II occurs in the Tohoku and Kyushu districts.

Because the aforesaid adsorbent used in this invention in the specific embodiment can be prepared by a simple manner from a rock naturally occuring in a large amount, a large amount of the adsorbent is obtained with much lower cost than those of the adsorbents such as silica gel, alumina, activated carbon, etc. Moreover, the adsorption power of the adsorbent to nitrogen is generally higher than that of molecular sieve 5A which is believed to show the highest adsorption power among synthetic zeolites under same temperature and pressure and in particular, the adsorption power of the adsorbent prepared from the tuff having the X-ray diffraction pattern shown in Table I is 2.5 times higher than that of the molecular sieve 5A. Furthermore, it has been confirmed from the valve (specific adsorbance) showing how many times is the concentration ratio of nitrogen to oxygen adsorbed on the adsorbent higher than the concentration ratio of nitrgen to oxygen in the gas in equilibrium with the adsorbent that the value of synthetic zeolite is about 2.5, while some of the adsorbent prepared from the naturally occuring tuff as mentioned above reaches 5. However, since the aforesaid excellent property is greatly deteriorated by adsorbing carbon dioxide gas and moisture, it is necessary to use air containing no such harmful components.

Thus, because the adsorbent mentioned above has such excellent property, high-pure nitrogen and high-pure oxygen can be recovered from air in large industrial scale by conducting the above-mentioned process of this invention as mentioned above using the adsorbent.

The above-mentioned dehydration treatment for the rock is conducted for removing water attached to the rock and water of crystallization of the rock and is conducted by heating generally the rock at about 350°-700°C., preferably 400°-600°C. When the heating temperature is lower than 350°C., the adsorbent prepared has poor adsorption power, while when the temperature is higher than 700°C., the structure of the rock is changed to such extent as being poor in practical use. As will be shown in Examples 4, 5, and 6, by using these adsorbents high-pure nitrogen and oxygen of about 30-95 percent in purity could be recovered from air with good efficiency.

The invention was explained above by referring to the example of separating nitrogen or nitrogen and oxygen from air but the same explanation can be applied to the separation of other gaseous mixtures by considering nitrogen and oxygen as a readily absorbable component and a less absorbable component in such gas mixture respectively.

The remakable merits of this invention will become apparent from the following examples of this invention. That is, Reference 1 is a comparison case where carbon dioxide gas and oxygen were separated from a mixture of them using activated carbon according to a conventional manner, that is, without applying the purging procedure with a high-pure carbon dioxide gas prior to conducting the desorption procedure by evacuation. The purity of the carbon dioxide and oxygen gas obtained by the conventional process were only 93.7 percent and 84.5 percent, respectively.

On the other hand, according to the process of Example 1 which is the first embodiment of the process of this invention, the purity of oxygen was 84.5 percent but the purity of the carbon dioxide gas reached as high as 99.95 percent and further the amount of the carbon dioxide gas thus obtained was far larger than the amount used for the purging procedure. Furthermore, in Example 2 wherein the second embodiment of this invention was applied, the purity of oxygen was 95 percent and further the purity of the carbon dioxide gas was 99.95 percent, which showed that the two components were almost completely separated from the gas mixture.

The same was true in Reference 2 and Examples 3 and 4, wherein the adsorbents prepared by treating the naturally occuring tuffs were used for separating nitrogen or nitrogen and oxygen from air. Reference 2 was conducted by a conventional process, while Example 3 was conducted by the first embodiment of the process of this invention and Example 4 was conducted by the second embodiment of this invention.

In Reference 2, the purity of the purest oxygen recovered was only 53 percent (maximum concentration 65 percent). Also, when the recovery of oxygen gas was continued until the composition of the gas at the outlet became that of air, the purity of the oxygen-rich gas thus recovered was only 41 percent. Also, the purity of nitrogen in Reference 2 was only 91.5 percent, while the purity of nitrogen recovered in Example 5 was 99.94 percent. Furthermore, in Example 4 the purity of oxygen was also as high as 93 percent.

The invention will, now, be explained practically by referring to the following examples.

REFERENCE 1

An adsorption colum having an inside diameter of 5 cm. and height of 90 cm. was packed with 940 g. of activated carbon of coconut shell. The column was preliminary evacuated by a suction pump and when the inside pressure of the column reached 20 mm. Hg, a 1 : 1 mixture of oxygen and carbon dioxide by volume ratio was introduced into the column to raise the pressure to normal pressure, and thereafter, the gas mixture was passed through the column at a speed of 4 liters/min. at room temperature and under normal pressure. When the concentration of the gas at the outlet became almost same as that at the inlet, the introduction of the gas mixture was stopped. The volume of gas thus recovered was 13.5 liters and the content of oxygen in the recovered gas was 84.5 percent, the balance being carbon dioxide gas. Thereafter, the column was evacuated and the gas was collected until the inside pressure of the column became 20 mm. Hg. The volume of the gas thus collected was 11.5 liters under normal pressure and normal temperature and it contained 93.7 percent carbon dioxide gas, the balance being oxygen.

EXAMPLE 1

Almost the same procedure was repeated as in Reference 1 by using the same adsorption column and adsorbent except that the desorption procedure was conducted after introducing 9.0 liters of a carbon dioxide gas of 99.9 percent in purity. The content of oxygen in the gas at the outlet of the column at the end of the operation was less than 1 percent. The volume of the carbon dioxide gas recovered by evacuating the column until the inside pressure of the column reached 20 mm. Hg. was 18.0 liters under normal temperature and normal pressure and the purity of carbon dioxide was 99.95 percent.

EXAMPLE 2

The same procedure as in Example 1 was followed except that prior to conducting the operation, oxygen of 95.0 percent in purity was introduced into the column until the pressure became normal pressure without introducing the gas mixture of oxygen and carbon dioxide immediately after the initial desorption by evacuation. The volume of the oxygen gas was 18 liters and the purity was 95 percent. Also, the volume of the carbon dioxide gas thus recovered was 18.0 liters and the purity was 99.95 percent.

REFERENCE 2

A desorption column having an inside diameter of 5 cm. and a length of 140 cm. was used. The adsorbent used was prepared from a tuff occured in the Chugoku district in Japan. As the results of chemical analysis, the rock was confirmed to having the following composition: $SiO_2$ 69.86 percent, $Al_2O_3$ 11.70 percent, $Fe_2O_3$ 1.76 percent, MgO trace, CaO 1.72%, $Na_2O$ 2.94%, $K_2O$ 1.79%, and $H_2O$ 10.76%.

Also, the X-ray diffraction pattern thereof was in the numeral ranges described in Table I.

The tuff was pulverized into 10–20 mesh, heated for one hour to 550°C. while passing dried air, and allowed to cool in a closed condition. Thereafter, 2.35 kg. of it was filled in the above column. The adsorption column was connected to a vacuum pump and the column was evacuated until the inside pressure of the column reached 50 mm. Hg. Then, air from which misture and carbon dioxide had been removed was introduced into the column to a normal pressure and thereafter, the air was further passed through the column at a speed of 3 liters/min. In this case, the inside pressure of the column was maintained almost at the atmospheric pressure. The maximum concentration of the oxygen in the gas discharged from the column was 65 percent and when the gas discharged from the column was collected until the concentration of the oxygen became 35 percent, the volume thereof was 6.3 liters. The mean concentration of oxygen in the recovered gas was 53 percent. Also, when the introduction of the air was continued until the content of oxygen in the gas at the outlet became 22 percent, the volume of the product gas thus recovered was 11.7 liters and and the mean oxygen concentration was 41 percent.

After the above procedure was over, the column was evacuated to 50 mm. Hg and the volume of the gas recovered was 21.1 liters under normal pressure and the mean oxygen concentration of the gas was 8.5 percent.

EXAMPLE 3

The same procedure as in Reference 2 was followed except that after finishing the introduction of air in the column, nitrogen of 99.9 percent in purity was introduced into the column from an end thereof while maintaining the inside pressure of the column at almost normal pressure and the gas inside the column was discharged from the opposite end of the column. When 12 liters of the nitrogen gas was introduced into the column, the content of oxygen in the gas discharged from the column was about 1 percent. Thereafter, the column was evacuated by means of a suction pump until the pressure became 50 mm. Hg and the volume of the gas recovered was 24.5 liters and the mean oxygen concentration in the gas was only 0.06 percent.

EXAMPLE 4

The same procedure as Example 3 was followed except that without introducing air into the column immediately after the end of the first evacuation for desorption, oxygen of 95 percent in purity was first introduced until the inside pressure of the column became almost normal pressure (10.7 liters of oxygen was required) and then air was introduced into the column while maintaining the inside pressure of the column at almost normal pressure. When the oxygen-rich gas discharged from the column was collected until the content of oxygen in the gas at the outlet end of the column became 65 percent, the volume of 14.7 liters of the gas was obtained and the mean oxygen concentration thereof was 93 percent. Also, when the oxygen-rich gas was recovered until the concentration of oxygen in the gas at the outlet end became 21.5 percent, the volume of 19.8 liters of the gas was obtained and the mean oxygen concentration was 74 percent. Furthermore, the volume of a pure nitrogen gas required for purging the column and the volume and purity of the nitrogen gas recovered at the evacuation step were almost same as those in Example 3.

Now, the invention was described hereinbefore mainly in respect of the fundamental embodiments of this invention using only a single adsorption column and further the process of this invention can be practiced more efficiently in industrial scale by employing a plurality of such adsorption columns, which will be described below in detail.

That is, as mentioned above the feature of the present invention is in the point of purging the adsorptoin column with a pure gas having the same composition as that of the readily adsorbable component under the same pressure as that in the adsorption processprior to the operation of the desorption procedure. The gas used for purging the adsorption column may be supplied from an outer source in the first purging step but for practicing the process of this invention as economical and dependent separation process, it is necessary to use the gas obtained in the previous desorption step as the purging gas after then. That is, the amount of the readily adsorbable component capable of being separated in one desorption cycle is the amount of the desorbed gas minus the amount of the purging gas required for purging the adsorption column. Therefore, in order to separate the readily adsorbable component efficiently and economically, it is necessary to reduce the amount of the purging gas as small as possible.

On the other hand, if the amount of the purging gas is reduced, the less readily adsorbable component apts to remain in the adsorption column to make impure the desorbed gas in the desorption step. Thus, the desorbed gas recovered in the desorption step is unsuitable for the purging gas in the subsequent purging step and it becomes impossible to separate the readily adsorbable gas component in a high pure state. In other words, if the embodiment as shown in FIG. 1 is practiced in an industrial scale for obtaining the readily adsorbable gas component in a high pure state, the yield thereof will be reduced.

Such a problem may not be so serious if the breakthrough curve for the less readily adsorbable gas component and the readily adsorbable gas component in the adsorption column is sufficiently sharp and flat but it becomes a serious fault when the particle size of the adsorbent is large, the diameter of the adsorption column is too large as compared with the length of the column, a combination of the kind of adsorbent and the kind of the gas component to be adsorbed thereto requires a long period of time for attaining the desorption equilibrium, and the periods of time required for conducting the adsorption, desorption, and purging operations are shortened.

Furthermore, as mentioned before, the process of this invention is practiced by repeating the three steps of adsorption, purging, and desorption or by repeating the four steps of feedback, adsorption, purging, and desorption and thus, in the system of employing a single adsorption column as illustrated in FIG. 1, it is difficult to introduce continuously the raw gas to be separated into each components into the adsorption column and further the product gas thus separated only in discontinuous manner. Accordingly, the process of this invention illustrated in FIG. 1 may be unsuitable as an aparatus or system for conducting the process in an industrial scale.

Figure 2:
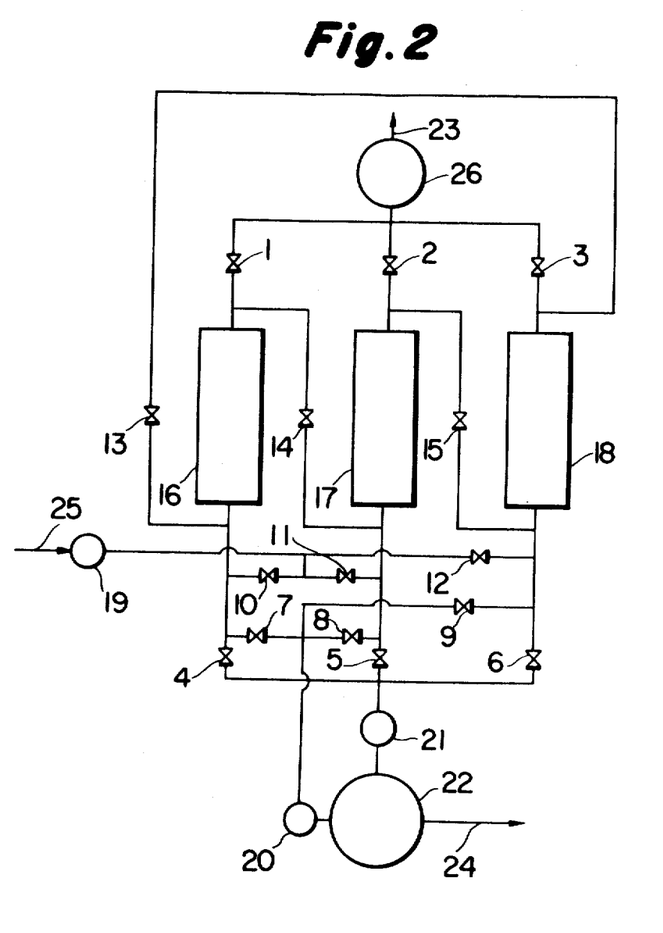
Figure 3:
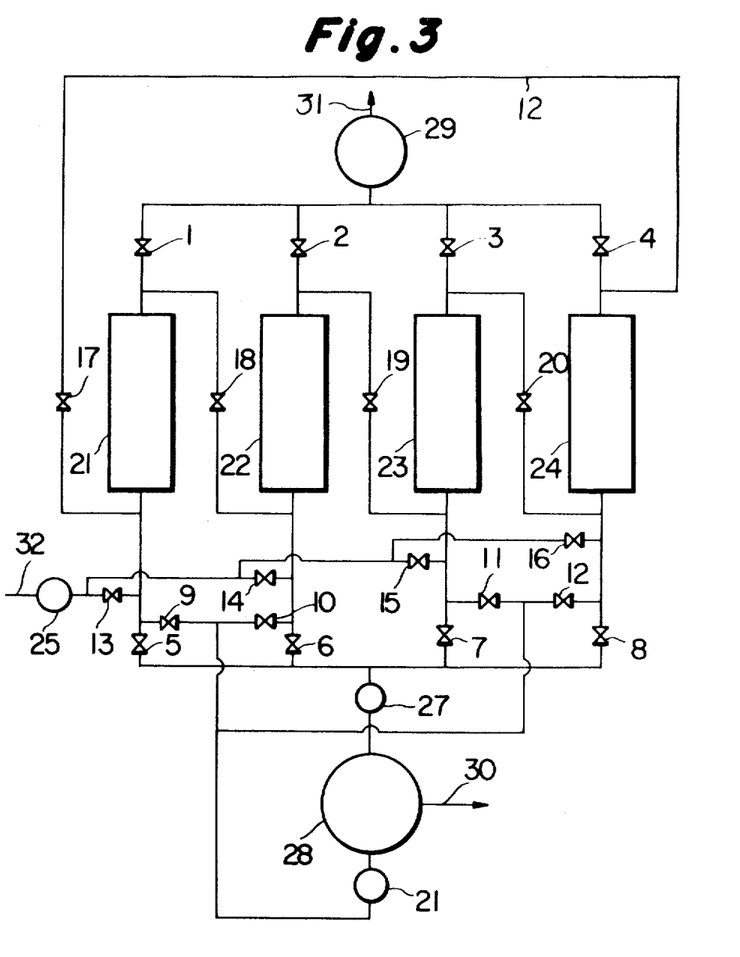

Thus, for practicing the process of this invention as illustrated above as an embodiment of the fundamental unit process thereof in an industrial and continuous process, the embodiments as illustrated in FIG. 2 and FIG. 3 of the accompanying drawings are suitable. That is, the process of this invention can be more effectively practiced in an industrial scale without accompanied with the aforesaid troubles. Thus, these embodiments will be explained below in detail by referring to the figures.

Now, in FIG. 2 is shown an industrially applicable embodiment of this invention, in which adsorption columns 16, 17, and 18 each containing an adsorbent are employed. The numerals of from 1 to 15 are valves, the numeral 18 is a feed gas blower, the numeral 20 is a blower for the readily adsorbable gas component, and the numeral 21 is a vacuum pump used in the case of conducting the desorption step under a pressure lower than atmospheric pressure. The use of the vacuum pump 21 is of course unnecessary when the adsorption step is conducted under pressure and the desorption step is conducted at normal pressure. Furthermore, the numeral 25 is a feed gas inlet, the numeral 24 is an outlet for the readily adsorbable gas component, the numeral 23 is an outlet for the less readily adsorbable gas component or a gas enriched with the less readily adsorbable gas component, and the numeral 26 is a tank for the less readily adsorbable gas component. The states of the valves 1–5 in each step are shown in Table 3 in which the mark (+) shows the valve being in an open state and the mark (−) shows the valve being in a closed state.

For example, as clear from Table 3 and FIG. 2, it will be understood that the adsorption column 16 is desorbed in the operation cycle numer 1 or 2, the adsorption column 17 is desorbed in the operation cycle number 3 or 4, and the adsorption column 18 in the operation cycle numer 5 or 6.

Furthermore, it will be understood that in the operation cycle numer 1 of Table 3, the adsorption column 16 is in a desorption step, the column 17 rests, and the column 18 is in an adsorption step of adsorbing the readily adsorbable gas component by introducing therein a feed gas.

Table III: State of each valve

| Operation cycle | No 1 | No 2 | No 3 | No 4 | No 5 | No 6 |
|---|---|---|---|---|---|---|
| Valve | | | | | | |
| 1 | − | − | + | + | − | − |
| 2 | − | − | − | − | + | + |
| 3 | + | + | − | − | − | − |
| 4 | + | + | − | − | − | − |
| 5 | − | − | + | + | − | − |
| 6 | − | − | − | − | + | + |

Table III: State of each valve — Continued

| | | | | | | |
|---|---|---|---|---|---|---|
| 7 | − | − | − | − | − | + |
| 8 | − | + | − | − | − | − |
| 9 | − | − | − | + | − | − |
| 10 | − | − | + | − | − | − |
| 11 | − | − | − | − | + | − |
| 12 | + | − | − | − | − | − |
| 13 | − | − | − | + | − | + |
| 14 | − | − | − | − | − | + |
| 15 | − | + | − | − | − | − |

In the operation cycle number 2, the adsorption column 16 is in the desorption step as in the previous step (the operation cycle number 1) but because the gas in the tank 22 for the readily adsorbable gas component is sent through the valve 8 to the adsorption column 17 by means of the gas blower 20, the column 17 is purged by the readily adsorbable gas component thus introduced. In this case, the valve 2 is in a closed state and the valve 3 in an open state, and thus the gas containing a certain amount of the less readily adsorbable gas component withdrawn from the opposite end of the column 17 is introduced into the adsorption column 18 through valve 15. Accordingly, when the purge of the adsorption column 17 is sufficiently conducted until the exhaust gas from the column 17 consists of almost the readily adsorbable gas component, the exhaust gas is effectively used for pre-purging the adsorption column 18, which contributes hreatly to save the amount of the purging gas.

Moreover, it has also been discovered that when the same procedure as the system as illustrated in FIG. 2 is conducted in accordance with the operation cycles as shown in Table 4, the aforesaid merit is completely lost and the amount of the high-pure readily adsorbable gas component obtained by one desorption step is greatly reduced. That is, when the system as illustrated in FIG. 2 is operated in the operation cycles as shown in Table 2, the feedback gas of the less readily adsorbable gas, the readily adsorbable gas for purging, etc., are successively introduced into each column and the system can be operated without resting the columns. Also, in such case, in each cycle of the operation cycle numbers 2,4, and 6, two adsorption columns are connected in series and thus the connected column can be subjected to the pre-purging procedure by the exhaust gas from the first column. Thus, at a Table IV : State of each valve

| Operation cycle | No 1 | No 2 | No 3 | No 4 | No 5 | No 6 |
|---|---|---|---|---|---|---|
| Valve | | | | | | |
| 1 | − | − | + | + | + | − |
| 2 | + | − | − | − | + | + |
| 3 | + | + | + | − | − | − |
| 4 | + | + | − | − | − | − |
| 5 | − | − | + | + | − | − |
| 6 | − | − | − | − | + | + |
| 7 | − | − | − | − | − | + |
| 8 | − | + | − | − | − | − |
| 9 | − | − | − | + | − | − |
| 10 | − | − | − | − | + | − |
| 11 | + | − | − | − | − | − |
| 12 | − | − | + | − | − | − |
| 13 | − | − | − | + | − | − |
| 14 | − | − | − | − | − | + |
| 15 | − | + | − | − | − | − | glance, it may be considered that there are no troubles in such an operation. However, in fact, the operation according to the operation cycles shown in Table 4 is accompanied with the great reduction in efficiency as compared with the operation by the operation cycles shown in Table 3. The reason is believed as follows.

That is, in the operation according to the cycles of the Table 3, for example, the column 18 is pre-purged by the exhaust gas from column 17 in the operation cycle number 2 but is in a rest state in the operation cycle number 3 and any gas is not introduced into the column 18 from outside in the step. Therefore, the portion of the adsorption column 18 adjacent to the side of the valve 15 will be purged further by the pure readily adsorbable gas component in the subsequent operation cycle 4 in such state that the portion has be pre-purged by the almost pure readily adsorbable component in the precious operation cycle, 3. On the other hand, in the operation by the cycles shown in Table 4, the procedures upto the operation cycle 2 may be same as above but a feed gas is introduced into the adsorption column 18 in the operation cycle 3 and then the column 18 is purged again by the pure readily adsorbable gas component in the subsequent operation cycle 4. Accordingly, the distribution of the readily adsorbable gas component in the adsorption column 18 becomes complicated and also the consumed amount of the readily adsorbable gas component for purging is increased, which result in lowering the efficiency through the whole process.

Now, returning to the operation by the cycles of Table 3, when almost no less readily adsorbable gas component becomes observable in the gas at the outlet of the adsorption column 17 in the purging cycle, the system is converted into the cycle shown by the operation cycle number 3 in Table 3. In this cycle, the adsorption column 17 is subjected to the desorption operation, whereby the adsorbed readily adsorbable gas component is desorbed and stored in the tank 22 by means of the pump 21. A part of the gas thus stored is used as the purging gas for the column 18 in the subsequent operation cycle (operation cycle number 4) and the remaining gas may be withdrawn as the product. Similarly, in the step of the operation cycle numer 4, the adsorption column 18 is purged by the gas from the tank 22 as mentioned just before and simultaneously the adsorption column 16 is pre-purged and further in the step of the operation cycle number 6, the adsorption column 16 is purged by the stored gas in the tank 22 and the adsorption column 17 is pre-purged.

As stated above, the steps of the operation cycle numbers 1, 2, 3, 4, 5, and 6 are converted successively when the concentration of the readily adsorbable gas component in the gas at the outlet side of each adsorption column in the purging step reaches a predetermined value and it will be easily understood that the concentration of the readily adsorbable component in the gas may be practiced or confirmed by a proper means, such as a densitometer for such a gas component disposed at or near the outlet side of each adsorption column. However, it will also be understood that after the relation of the variation of the concentration of the readily adsorbable gas in the gas at the outlet side of the adsorption columns with the passage of time has been confirmed by preliminary experiment, a simple operation such as exchanging the cycles every predetermined period of time by means of, e.g., a timer if the composition of the feed gas from the conduit 25 as well as the flow amount thereof are constant, the amount and the purity of the purging gas from the blower 20 are constant, and also the adsorption powers of the adsorption column 16, 17, and 18 are constant.

Also, the process of the first embodiment of the present invention as previously indicated may be practiced in the system illustrated in FIG. 2 by operating other valves than the valves 1, 2, and 3 in accordance with the operation shown in Table 3 but by operating the valve 1 so that the valve is in a closed state in the step of the operation cycle number 3 of Table 3 until the inside pressure of the adsorption column 16 reaches almost the pressure in the adsorption step and is in an open state in the last period of the same cycle, operating the valve 2 so that the valve is in a closed state in the step of the operation cycle number 5 until the inside pressure of the adsorption column 17 reaches the pressure in the adsorption step but in an open state in the last period of the same cycle, and operating the valve 3 so that the valve is in a closed state in the step of the operation cycle number 1 until the inside pressure of the adsorption column 18 reaches the pressure in the adsorption step but in an open state in the last period of the same cycle. In this embodiment the use of the tank 26 for the less readily adsorbable gas component is unnecessary.

Moreover, the second embodiment of the present invention as previously indicated may be practiced in the system shown in FIG. 2 by operating other valves than the valves 10, 11, and 12 in accordance with the operation shown in Table 3 but operating the valve 10 so that the valve is in a closed state in the step of the operation cycle number 3 until the inside pressure of the adsorption column 16 reaches the pressure in the adsorption step and is in an open state in the last period of the cycle, operating the valve 11 so that the valve is in a closed state in the step of the operation cycle number 5 until the pressure of the adsorption column 17 reaches the pressure in the adsorption step but in an open state in the last period of the same cycle, and operating the valve 12 so that the valve is in a closed state until the inside pressure of the adsorption column 18 reaches the pressure in the adsorption step but is in an open state in the last period of the same cycle.

As mentioned above, the typical example of practicing effectively the process of this invention using the three adsorption columns were described by referring to the system shown in FIG. 2. The inventor has further investigated various effective processes of practicing the invention and as the results thereof has found other embodiment as shown in FIG. 3 of the accompanying drawings. By the embodiment shown in FIG. 3, the less readily adsorbable gas component and the readily adsorbable gas component can be separated simultaneously in high-pure states and with good yields in each case. Furthermore, in the embodiment the gas blowers 19 and 20 for sending continuously gases into the system may be ones having a low capacity. Thus, the process of the embodiment is more effective and preferable for practicing the process of this invention industrially and economically.

Now in FIG. 3 the numerals from 1 to 20 are valves, the numerals 21, 22, 23, and 24 are adsorption columns each containing an adsorbent, the numeral 25 is a blower for the feed gas, and the numeral 26 is a blower for the readily adsorbable gas component. Also, the numeral 27 is a vacuum pump used in case of conducting the desorption procedure under a reduced pressure. Of course, the pump 27 is unnecessary when the adsorption is conducted under pressure and the desorption is conducted under normal pressure. The numeral 28 is a tank for storing the readily adsorbable gas component and the numeral 29 is a tank for storing the less readily adsorbable gas component, The numeral 30 is an outlet for the

TABLE V: STATE OF EACH VALVE

| Operation cycle No. | 1 | 2 | 3 | 4 | 5 | 6 | 7 | 8 |
|---|---|---|---|---|---|---|---|---|
| Valve: | | | | | | | | |
| 1 | − | − | + | + | + | + | + | − |
| 2 | − | − | − | − | + | + | + | − |
| 3 | + | − | − | − | − | − | + | + |
| 4 | + | + | + | − | − | − | − | − |
| 5 | + | + | − | − | − | − | − | − |
| 6 | − | − | + | + | − | − | − | − |
| 7 | − | − | − | − | + | + | − | − |
| 8 | − | − | − | − | − | − | + | + |
| 9 | − | − | − | − | − | − | + | + |
| 10 | + | + | − | − | − | − | − | − |
| 11 | − | − | + | + | − | − | − | − |
| 12 | − | − | − | − | + | + | − | − |
| 13 | − | − | − | + | + | − | − | − |
| 14 | − | − | − | − | − | + | + | − |
| 15 | + | + | − | − | − | − | − | + |
| 16 | − | + | + | − | − | − | − | − |
| 17 | − | − | − | + | + | + | − | − |
| 18 | − | − | − | − | − | + | + | + |
| 19 | + | + | − | − | − | − | − | + |
| 20 | − | + | + | + | − | − | − | − | product gas composed of the high-pure readily adsorbable gas component and the numeral 30 is an outlet for the product gas composed of the high-pure less readily adsorbable gas component. Furthermore, the numeral 32 is an inlet for the feed gas to be separated into each components.

Thus, by operating the four-column system as shown in FIG. 3 in accordance with the manner as shown in Table 5, the feedback procedure by the less readily adsorbable gas component, the adsorption of the readily adsorbable gas component in the feed gas, the purging procedure by the pure readily adsorbable gas component under the pressure almost same as that in the adsorption step, and the desorption under a pressure lower than the pressure in the adsorption step are conducted successively and in order to each adsorption column and the more effective process of the second embodiment of this invention including the feedback operation can be practiced by the aforesaid process. That is, by the process as mentioned above, the high-pure readily adsorbable gas component can be withdrawn through the conduit 30 with a high yield and at the same time the high-pure less readily adsorbable gas component can also be withdrawn through the conduit 31.

Also, it will be clear by the below-showing Example 5 of this invention how the process of this invention illustrated in Example 2 is excellent in practical use. That is, the dimensions of each adsorption columns and the nature and amount of the adsorbent used in Example 5 were completely same as those used in the above indicated examples of this invention but the particle size of the adsorbent in Example 5 was 4–6 mesh, which was far smaller than that of the adsorbent in Reference 2 and Examples 4–6. Also, the amount of the feed gas supplied was 3 liters/min. in Example 5, which was as high as about thrice the rate of the introduction of air in Examples 3 and 4. Furthermore, the final vacuum pressure was 73 mm. Hg in Example 5, while it was 50 mm. Hg in Reference 2 and Examples 3 and 4

Thus, although the various conditions in Example 5 were far disadvantageous for conducting the separation of oxygen and nitrogen from air as compared with the conditions in Reference 2 and Examples 3 and 4, the amount and the purity of nitrogen gas obtained in Example 7 was almost same as those in Reference 2 and Examples 3 and 4. This is because, as will be described below, in Example 5 the desorption cycle was repeated every 1.5 minutes and a high-pure nitrogen gas of 99.98–99.96 percent in purity was formed in a rate of 480 liters/hour. Therefore, the volume of the nitrogen gas thus obtained was 12 liters per cycle of the adsorption column, which was almost same as the case of conducting the adsorption process using the single adsorption column in accordance with the process of this invention.

EXAMPLE 5

Four adsorption columns each having the same dimensions as in Reference 2 and containing the same adsorbent as in Reference 2 were arranged as shown in FIG. 3. In this case, however, the particle size of the adsorbent was 4–6 mesh (Tyler mesh). The minimum pressure in the adsorption column at the desorption step was 73 mm. Hg and further each operation of the feedback, adsorption, and purging steps was conducted under almost atmospheric pressure. Also, the period of time required for finishing the desorption step was 1.5 minutes per adsorption column. The valves were operated as shown in Table 5.

Under the conditions as mentioned above, air from which carbon dioxide and moisture had been preliminary removed was introduced into the separation system continuously at a rate of 630 liters per hour and a nitrogen gas having a purity of 99.98 –99.96 percent was obtained in a rate of 480 liters per hour. Also, an oxygen containing gas was obtained as the less readily adsorbable gas component at a rate of 150 liters per hour and it contained only about 9 percent nitrogen.

What is claimed is:

1. In a process for separating a readily adsorbable gas component from a gas mixture of the readily adsorbable gas component and a less readily adsorbable gas component, which comprises introducing the gas mixture into an adsorption column having an inlet and an outlet, and containing an adsorbent to adsorb the readily adsorbable gas component and recovering the readily adsorbable gas component by desorbing the component thus adsorbed under a reduced pressure, the improvement wherein (1) the adsorption of the readily adsorbable gas component is continued until the composition of the gas at the outlet of the column is substantially the same as the composition of the gas at the inlet of the column, and (2) prior to the desorption step, the inside of the column is purged with a substantially pure gas having substantially the same composition as the readily adsorbable gas component under substantially the same pressure as employed in the adsorption step.

2. The process as claimed in claim 1 wherein said adsorbent is prepared by dehydrating a tuff mainly consisting of $SiO_2$, $Al_2O_3$ and $H_2O$, containing 1–10 percent by weight of alkali metal and alkaline earth metal oxides, and having the X-ray diffraction pattern shown in the preceeding Table I or Table II.

3. The process as claimed in claim 1 wherein said readily adsorbable gas component is nitrogen and said less readily adsorbable gas component is oxygen.

4. A process for separating a readily adsorbable gas component and a less readily adsorbable gas component from a gas mixture thereof, which comprises introducing the gas mixture into an adsorption column having an inlet and an outlet, and containing an adsorbent to adsorb the readily adsorbable gas component, while recovering the less readily adsorbable gas component, and then recovering the readily adsorbable gas component by desorbing the component thus adsorbed under reduced pressure, the improvement wherein (1) a substantially pure gas having substantially the same composition as the less readily adsorbable component is introduced into the column prior to the introduction of the gas mixture into the column until the inside pressure of the column becomes substantially the same as the pressure employed in the adsorption step, (2) the adsorption of the readily adsorbable gas component is continued until the composition of the gas at the outlet of the column is substantially the same as the composition of the gas at the inlet of the column, and (3) prior to the desorption step, the inside of the column is purged with a substantially pure gas having substantially the same composition as the readily adsorbable gas component under substantially the same pressure as employed in the adsorption step.

5. The process as claimed in claim 4 wherein said adsorbent is preapred by dehydrating a tuff mainly consisting of $SiO_2$, $Al_2O_3$ and $H_2O$, containing 1–10 percent by weight of alkali metal or alkaline earth metal oxides, and having the X-ray diffraction pattern shown in the preceeding Table I or Table II.

6. The process as claimed in claim 4 wherein said readily adsorbable gas component is nitrogen and said less readily adsorbable gas component is oxygen.

* * * * *